United States Patent [19]

Trenda et al.

[11] 3,985,598

[45] Oct. 12, 1976

[54] MATERIAL REPAIR PROCESS

[75] Inventors: Dorn D. Trenda, Anoka; Donald R. Anderson, Blaine, both of Minn.

[73] Assignee: The Perma Company, Anoka, Minn.

[22] Filed: Nov. 18, 1974

[21] Appl. No.: 524,409

[52] U.S. Cl. .................. 156/54; 156/153; 156/322; 264/36; 427/140; 428/63

[51] Int. Cl.² .................. B32B 35/00

[58] Field of Search .................. 156/94, 98, 321, 153, 156/322; 117/2 R; 264/36; 428/63; 427/140

[56] References Cited

UNITED STATES PATENTS

| | | | |
|---|---|---|---|
| 1,475,029 | 11/1923 | Risk | 156/322 |
| 2,681,877 | 6/1954 | Seymour | 156/94 |
| 2,855,338 | 10/1958 | Mulkey | 156/94 |
| 3,138,505 | 6/1964 | Hirsch | 156/94 |
| 3,397,100 | 8/1968 | Christie | 156/321 |
| 3,513,048 | 5/1970 | Snyder | 156/98 |
| 3,772,114 | 11/1973 | Kowalchuk | 156/94 |
| 3,814,645 | 6/1974 | Fletcher | 156/153 |

*Primary Examiner*—Edward G. Whitby
*Attorney, Agent, or Firm*—Merchant, Gould, Smith, Edell, Welter & Schmidt

[57] ABSTRACT

A process for the repair or reinforcement of fabrics woven of smooth surface synthetic fibers, such as nylon. A swatch of like material having one side coated with a heat sensitive adhesive is used. The area to be repaired or reinforced is buffed with fine grit abrasive to artificially raise a nap on the threads. The area to be repaired may then be preheated. The patch is placed in face-to-face contact with the buffed area and pressure and heat are applied to effect a weather-proof bond between the fabric surfaces.

9 Claims, 3 Drawing Figures

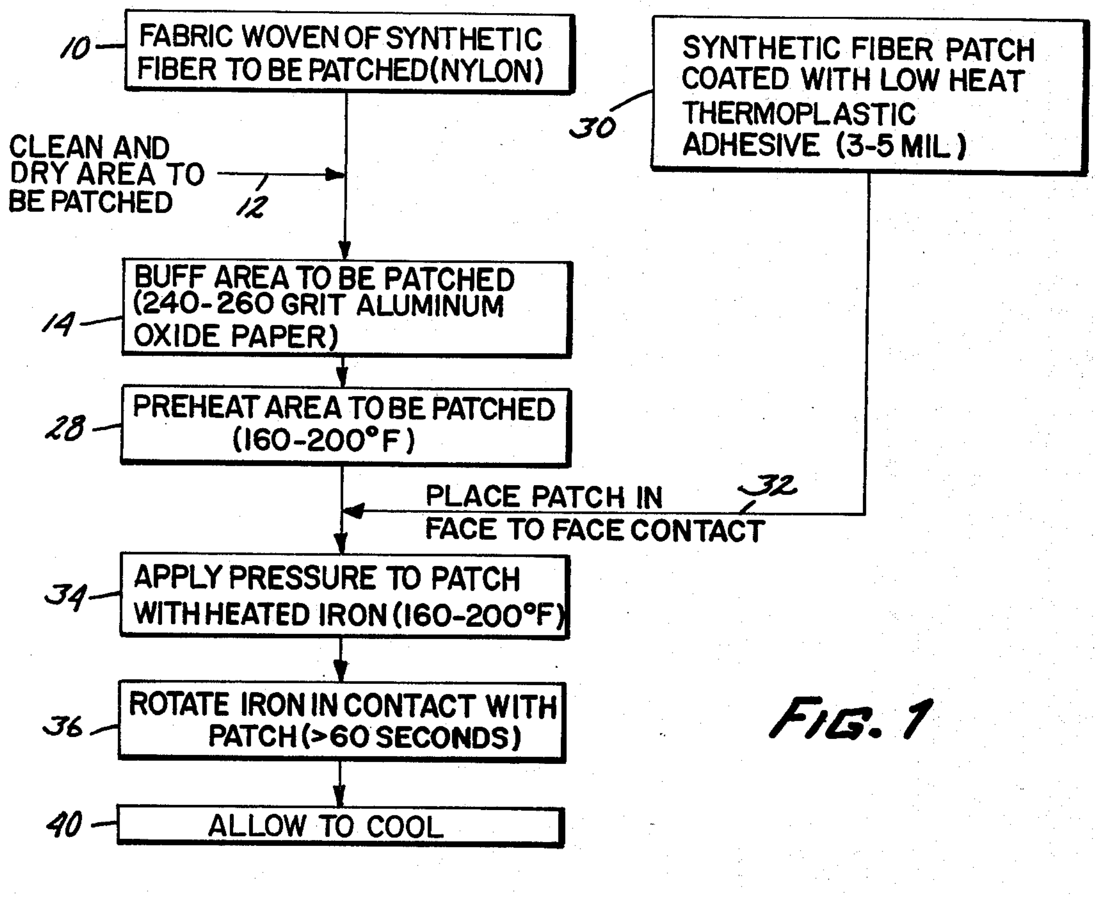
FIG. 1
FIG. 2
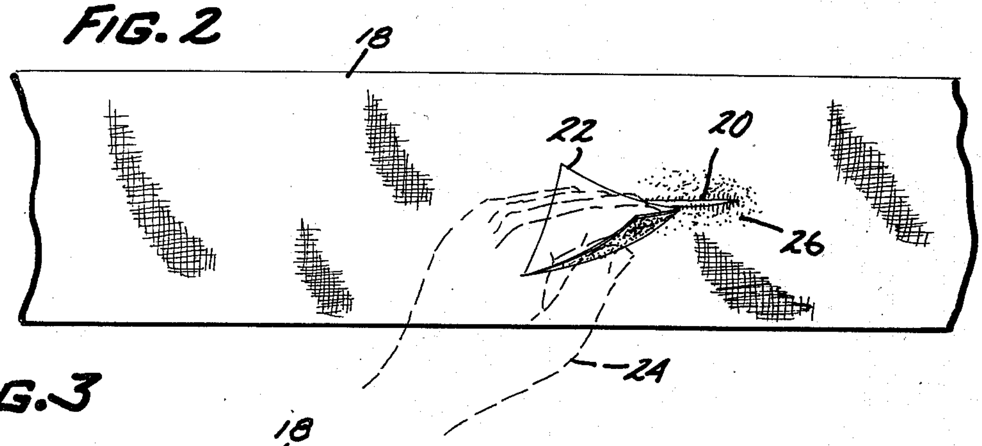
FIG. 3
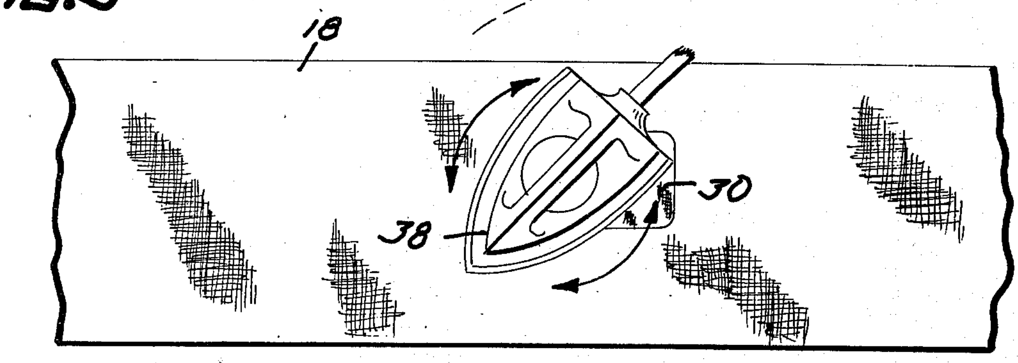

MATERIAL REPAIR PROCESS

BACKGROUND OF THE INVENTION

This invention relates generally to methods of synthetic fiber fabric reinforcement or repair and more particularly concerns a patch or reinforcing swatch of material for such fabrics and a process developed which enables so-called "iron-on" repair to be performed.

While iron-on canvas and denim patches and methods for applying these patchess are known in the art, the development of a weatherproof synthetic fiber fabric repair of similar nature has been impeded by a number of perplexing problems.

First, individual fiber strands or threads of a number of synthetic fabrics (for example, nylon, a material woven of synthetic polyamide fibers) have smooth regular unroughened exterior surfaces. These smooth exterior surfaces make it difficult to successfully apply a heat-activated adhesive type repair because there is relatively little rough surface area and interstices into which the adhesive may flow and bond when heat activation occurs. These factors tend to result in a repair fabric which will easily peel off or pull away from fabric to which it is applied.

Second, synthetic fiber fabrics are generally substantially less resistant to heat damage than are cotton and other natural fiber fabrics. In practice, it is possible to scorch or significantly damage some nylon fabrics at temperatures in the vicinity of 300° Fahrenheit (F). This additional constraint complicates obtaining a reliable nylon or other synthetic fiber repair using a patch with heat-activated adhesive, because the adhesive activation temperature should be higher than garment temperatures normally encountered (e.g. 120° F.), yet lower than the temperature at which the fabric may be damaged.

Despite these obstacles, fabric repair using patches have heat-activated adhesives is desirable because such patches require a minimum of user contact with the adhesive and permit the adhesive to be uniformly applied to one surface by a production process rather than by the user. Furthermore, liquid adhesives may often be suspended in a highly volatile and/or inflammable vehicle. This renders them hazardous to use in unventilated environments and creates source of irritation to the user.

In response to this need Applicants have developed and discovered a process for the reinforcing or repair of fabrics woven of synthetic fibers in which a reinforcing patch or swatch may be applied by use of an ordinary household garment pressing iron. Use of this process has been demonstrated to result in reliable and waterproof patching and reinforcing of synthetic fabrcis such as nylon.

SUMMARY OF THE INVENTION

In accordance with the invention, a fabric woven of smooth-surfaced synthetic fiber threads is processed to raise a nap on the threads on one side of the fabric in the area to be repaired or reinforced. A patch or swatch of fabric to which a layer of heat-activated adhesive has been applied is placed with its adhesive its in face-to-face contact with the area in which the nap has been raised. Heat is applied to the patch and fabric to be repaired to bring the adhesive to tis working or activation temperature. Pressure is also applied to the patch-fabric sandwich to cause the adhesive material to migrate or flow to evenly provide a bond between the patch and fabric area being repaired or reinforced.

In certain procedures within the scope of the present invention, aluminum oxide paper having a grit size on the range of 240 – 260 may be used to effect the raising of the fabric nap. By lightly buffing the fabric in the area to be patched with such abrasive paper, it is possible to artificially create a nap on the fabric for the purpose of bonding without pulling threads or causing runs in the fabric.

BRIEF DESCRIPTION OF THE DRAWINGS

Other objects and advantages of the invention will become apparent upon reading the following detailed description and upon reference to the drawings, in which:

FIG. 1 is a flow chart illustrating in detail steps which may be followed in the process of repairing or reinforcing a synthetic fiber fabric according to one procedure within the scope of the present invention;

FIG. 2. is a perspective view illustrating a particular procedure for the step of raising the nap of the fabric in the area to be patched or reinforced; and FIG. 3 is a plan view showing a procedure involving rotating of a heated iron in contact with a patch being applied in accordance with the present invention.

While the invention will now be described in connection with preferred procedures, the invention is not limited in scope to those specific procedures or particular steps set forth. On the contrary, all alternatives, modifications and equivalents included within the spirit and scope of this invention as defined by the appended claims are covered.

DETAILED DESCRIPTION OF THE INVENTION

Turning first to FIG. 1, there is shown a flow chart illustrative of a detailed set of steps illustrating one way of practicing the inventive process for reinforcing or patching of synthetic fiber fabrics. In FIG. 1, a fabric 10 woven of synthetic fiber to be patched or reinforced in represented in block form at the upper left hand corner of the flow chart.

While the present inventive method is applicable to patching or reinforcing of fabrics woven of smooth surfaced synthetic fibers of any type, perhaps the most common application will be to nylon, that is, synthetic polyamide material fabrics. Nylon fabrics are woven of individual monofilament strands which are regular and smooth-surfaced. These individual fibers, rather than being strands comprising many shorter fibers twisted together with a significant number of surface area discontinuities (common in cotton and other natural fiber threads) are generally single strands having a regular, nearly circular, cross-section.

While not essential to the present inventive process, it is preferable to clean and dry the area of the fabric to be patched or reinforced to remove any oil, greasse, dirt or other foreign matter which may be present. This preliminary procedure is identified by arrow 12 in FIG. 1.

One surface of the fabric in the area to be patched or reinforced is then worked to artificially raise a nap on the fabric surface in the area to be patched. One procedure developed by Applicants for raising this nap without pulling threads or creating runs in nylon fabric is by light manual buffing of one side of the fabric in the area to be patched or reinforced with a fine grit abrasive. In FIG. 1, this step in the procedure is a block labeled "Buff Area To Be Patched (240 – 260 grit aluminum oxide paper)" 14. While emerycloth having a comparable abrasive grit size or steel wool may also be used, it has been found preferable to use 240 – 260 grit open coat aluminum oxide paper or emerycloth for the purpose of the buffing procedure as these materials do not leave a residue interfering with patch adhesion.

FIG. 2 is illustrative of a preferred procedure for buffing. FIG. 2 shows a piece of a fabric 18 having a cut or tear generally designated 20. In the process of patching the area of the fabric surrounding cut or tear 20 it is necessary to raise a nap on the fabric in the area to be patched. This is accomplished by the use of a small square (e.g. two inches by two inches) of abrasive material 22. While steel wook, emerycloth or another abrasive material might also be used, it has been found preferable to use either open coat aluminum oxide paper having a grit size between 240 – 260 or emerycloth with a similar grit size. The area should be buffed with a light pressure to raise the nap without pulling threads. The proper buffing pressure with this material is light to the touch manual pressure with the abrasive material. Use of light manual buffing pressure between the abrasive material 22 is illustrated by a hand 24 shown in dotted line form performing buffing of the area of the fabric to be repaired. Buffing should continue until a slight nap is raised on the surface of the fabric. This is shown in FIG. 2 as a shaded area 26 surrounding tear 20. Care must be taken not to use too large a grip of abrasive material so that threads will not be pulled from the fabric in the area in which the patch is to be applied. Applicants have found that use of an abrasive material of grit in the range specified above meets this objective, yet does not require undue effort in the nap raising procedure.

Following the step of raising the nap on the fabric in the area to be patched, it may be desirable to preheat fabric 10 in the area where patching or reinforcement will occur. This is identified by block 28 in FIG. 1. This is especially true if the source of heat being used in subsequent repair process steps is an ordinary household iron, because once a patch is applied over the fabric, it is difficult to heat the patchfabric sandwich evenly with a single iron. However, it would also be possible to apply heat to the area to be patched and to the fabric comprising the patch at the same time, for example, by passing the patch and fabric through an oven to bring them both to the working or activation temperature of the adhesive used.

Shown in block form at the upper right of the flow chart of FIG. 1 is a synthetic fiber patch 30 coated with low heat thermoplastic adhesive to a thickness of 0.003 to 0.005 of an inch. This is the reinforcing or patching material. In most applications of the inventive process, patch 30 will be fabric of like material to the fabric to be patched or reinforced. One side of the patch 30 has applied to it a heat sensitive adhesive material. It has been found preferable to use a low heat thermoplastic polyestr base adhesive, an example being B. F. Goodrich TFX013 "Tuftane", a low heat film adhesive applied to a thickness in the range of 0.003 to 0.005 inches by laminating a film of the adhesive of that thickness to one side of the patch fabric.

It should be understood that the present invention is not necessarily limited to use of this particular adhesive or any means of applying it to patch 30. It may be possible to substitute a number of other heat sensitive adhesives which reach a working or activated state at the proper temperature. However, it is important that whatever adhesive is used to be selected so that its working or activation temperature, the temperature at which it flows and is capable of adhesive bonding, be substantially less than the temperature at which the fabric to be patched will be damaged by scorching, melting or other fabric degradation.

Patch 30 is cut slightly larger than the area to be repaired or reinforced. The corners of the patch are preferably rounded to avoid sharp angles which might catch and pul away at a later time. The trimmed patch 30 is then placed on the fabric to be patched with its adhesive side in face-to-face contact with the raised nap surface. This is as indicated by an arrow 32 and associated descriptive language in the flow chart of FIG. 1.

The patch and fabric sandwich thus created is then heated to bring the adhesive to its activation or working temperature. As shown in the flow chart of FIG. 1, for nylon and most synthetics, it is preferable to have an adhesive which reaches this temperature between 160° and 200° F., substantially below the point of danger to most synthetic fabrics, yet somewhat above environment temperatures usually encountered to prevent loosening in garment use.

Once the patch and fabric to be repaired are brought to the activation temperature, the adhesive will reach a flowable state and will adhere to both fabrics and the nap created on the fabric being repaired. Pressure is then applied to the patch and fabric sandwich while they remain at the elevated temperature to cause migration of the adhesive material and even distribution of adhesive beetween patch 30 and fabric 10. In addition, application of pressure causes adhesive to migrate about and around the nap and strengthens the adhesive bond created.

In the flow chart shown in FIG. 1, it is contemplated that an ordinary household pressing iron be used for the heating and pressure applying steps. As previously mentioned, when this type of heat source is used, it is desirable to preheat the area to be patched prior to placing the patch in face-to-face contact. This is because the patch will somewhat insulate the fabric being repaired from the heat transferred by an ironing procedure after it is applied. Therefore, if a single surface iron is being used, the area to be patched should be preheated by ironing with an iron at a setting in the range of the activation temperature of the adhesive. If an iron is being used, it is also desirable to place the fabric and patch sandwich on a firm substantially planar surface such as a wooden board with patch 30 placed adhesive side down over fabric 10. The heated iron is then placed on the patch to heat the patch to the activation temperature of the adhesive, while manual pressure is applied on the iron to cause flow of the adhesive and migration to effect a uniform distribution of adhesive between the two pieces of material. This procedure is represented by block 34 in FIG. 1.

In procedures in which a household iron is used as heat source, it has also been found advantageous to rotate the heated iron in contact with the patch for a period in excess of sixty seconds with the iron at the temperature in the range of the activation temperature of the adhesive (shown as block 36 in FIG. 1). This promotes uniform flow and distribution of the adhesive and promotes uniformity of the bond.

FIG. 3 is a plan view illustrating the step of rotating a heated iron 38 in contact with patch 30 while the fabric to be patched is placed over a solid substantially planar surface to promote the application of pressure to the patch and fabric sandwich in the bonding process. Those of skill in the art will readily understand that it is not absolutely necessary to use an ordinary household iron for the purpose of applying heat and pressure to activate the adhesive and promote the adhesive bond between the patch and fabric. It would also be possible to effect the bond by heating the fabric sandwich to the activation temperature in an oven and then passing the sandwich through pressure rollers to force the fabrics together and uniformly distribute the adhesive. It will also be understood that it is not necessary to use a heat sensitive adhesive having an activation or working temperature in the range of 160° – 200° F. However, it is highly desirable to use such an adhesive because it simpliifies the process for a user. The activation temperature can then be obtained merely by setting an ordinary household iron on its synthetic fabric setting. Thus, a readily obtainable source of the appropriate amount of heat is available, and the method of patching or reinforcing is easier to carry out since the normal setting for such synthetic fabrics is in fact used for the purpose of bonding. Finally, the repaired or reinforced fabric should be allowed to cool for a suitable period to enable the adhesive to set (indicated by block 40 in FIG. 1). For a procedure in which adhesive having an activation temperature in the range specified above is used, a cooling period of at least two minutes at normal room temperatures is sufficient. The result of the process should be a strong weatherproof fabric bond.

From the detailed description above, it is apparent that a process for the purpose of reinforcing or patching fabrics woen from smooth surfaced synthetic fibers fully satisfying the aims and advantages set forth above has been provided. The invention has been described above in conjunction with specific procedures and steps. Certainly, a number of alternatives, modifications and variations of these procedures and steps will be apparent to those skilled in the art in light of the foregoing description. Accordingly, it is intended to embrace all such alternatives, modifications, and variations as fall within the spirit and scope of the appended claims.

What is claimed is:

1. A method of reinforcing an area of nylon fiber fabric using a reinforcing swatch of nylon fabric to one side of which a heat-activatable adhesive having a working temperature below the temperature at which nylon fabric may be damaged has been applied, comprising the steps of:

a. buffing one side of the area to be reinforced to artificially raise a slight nap on the nylon fibers thereof;

b. placing said reinforcing swatch on said fabric with said one side thereof in face-to-face contact with said buffed side of the area to be reinforced;

c. heating said swatch and said area to the working temperature of said adhesive; and d. pressing said swatch and said fabric together with said adhesive at said working temperature.

2. The method according to claim 1 wherein said adhesive has a working temperature in the range of 160° – 200° F., and is applied to said one side of said swatch to a thickness in the range of 0.003 – 0.005 inches.

3. A method of repairing damaged fabric woven of smooth-surfaced synthetic fibers using a repair patch of like fabric having applied to an ahdesive side thereof a heat activatable adhesive, comprising the steps of:

a. buffing the fabric in the area to be patched with an abrasive material having a grit size in the range of 240–260 or equivalent roughness to raise a nap thereon;

b. preheating the area to be patched to the adhesive activation temperature;

c. applying the patch to said preheated area with said adhesive side in face-to-face contact therewith;

d. applying heat to said patch to bring said patch to said activation temperature; and e. applying pressure to force said patch and said area to be pressed together and to facilitate migration of said activated adhesive material.

4. The method of claim 3 wherein the step of buffing with an abrasive material having a grit size in the range of 240–260 is performed with aluminum oxide paper.

5. The method of claim 4 wherein the step of buffing with an abrasive material having a grit size in the range of 240–260 is performed with emerycloth.

6. A method of repairing damaged fabric woven of nylon (synthetic polyamide material) fibers using a repair patch of like fabric having applied to an adhesive side thereof a heat activatable adhesive having an activation temperature in the range of 160° – 200° F, comprising the steps of:

a. raising a nap on the fabric in the area to be patched;

b. preheating the area to be patched to the adhesive activation temperature of 160° – 200° F;

c. applying the patch to said preheated area with said adhesive side in face-to-face contact therewith;

d. applying heat to said patch to bring said patch to said activation temperature; and e. applying pressure to force said patch and said area to be pressed together and to facilitate migration of said activated adhesive material.

7. A method of repairing damaged fabric of smooth-surfaced synthetic fiber using a repair patch of like fabric having applied to an adhesive side thereof a heat activatable adhesive, comprising the steps of:

a. buffing the area on the fabric to be patched with an abrasive material to raise a nap thereon;

b. preheating the area to be patched to the adhesive activation temperature;

c. applying the patch to said preheated area with said adhesive side in face-to-face contact therewith;

d. placing said area to be patched against a firm substantially planar support surface; and e. manually pressing said patch and area with an iron having a temperature in the range of 160° – 200° F.

8. The method of claim 7 wherein the step of manually pressing further includes the substep of rotating the iron in contact with the patch while applying manual pressure to the iron.

9. The method of claim 8 followed by the step of pressing the iron firmly about the edges of the patch to seal the edges to said area to be patched.

* * * * *